United States Patent
Azenkot et al.

(10) Patent No.: US 8,144,800 B2
(45) Date of Patent: Mar. 27, 2012

(54) DOWNSTREAM TRANSMITTER AND CABLE MODEM RECEIVER FOR 1024 QAM

(75) Inventors: Yehuda Azenkot, San Jose, CA (US); Selim Shlomo Rakib, Cupertino, CA (US)

(73) Assignee: Broadcom Corporatino, Irvine, CA (US)

( * ) Notice: Subject to any disclaimer, the term of this patent is extended or adjusted under 35 U.S.C. 154(b) by 706 days.

(21) Appl. No.: 10/944,962

(22) Filed: Sep. 18, 2004

(65) Prior Publication Data

US 2006/0085727 A1    Apr. 20, 2006

(51) Int. Cl.
*H03C 5/00* (2006.01)
*H04B 1/38* (2006.01)

(52) U.S. Cl. ........................ 375/268; 375/222

(58) Field of Classification Search .............. 375/219, 375/222, 223, 259, 260, 261, 265, 268, 295, 375/298; 370/485, 480, 464; 725/111, 109, 725/105; 714/699, 746, 786, 792, 752, 758, 714/776

See application file for complete search history.

(56) References Cited

U.S. PATENT DOCUMENTS

| | | | | |
|---|---|---|---|---|
| 4,809,300 | A * | 2/1989 | Goldstein et al. | 375/340 |
| 5,231,665 | A * | 7/1993 | Auld et al. | 380/241 |
| 5,608,755 | A * | 3/1997 | Rakib | 375/219 |
| 6,724,829 | B1 * | 4/2004 | Tzukerman et al. | 375/295 |
| 2002/0181604 | A1 | 12/2002 | Chen | 375/279 |
| 2005/0143004 | A1 * | 6/2005 | Dibiaso et al. | 455/12.1 |
| 2007/0011716 | A1 * | 1/2007 | Koslov et al. | 725/135 |
| 2008/0170640 | A1 * | 7/2008 | Gao et al. | 375/302 |

FOREIGN PATENT DOCUMENTS

WO    WO 01/39456 A1    5/2001

OTHER PUBLICATIONS

L. Papke and K. Fazel, "Combined Multilevel Turbo-code with MR-modulation" Jun. 18, 1995. pp. 668-672, German Aerospace Research Establishment (DLR), Institute for Communications Technology, 1995 IEEE.
ITU-T Telecommunication Standardization Section of ITU "Series J: Transmission of Television, Sound Programme and Other Multimedia Signals—Digital Transmission of Television Signals" ITU-T Recommendation J.83, International Telecommunication Union, Apr. 1997.

* cited by examiner

*Primary Examiner* — David C. Payne
*Assistant Examiner* — Vineeta Panwalkar
(74) *Attorney, Agent, or Firm* — Thomas, Kayden, Horstemeyer & Risley, LLP

(57) ABSTRACT

A headend transmitter that transmits 1024 QAM including a 256 QAM modulator which has been modified to have more aggressive forward error correction processing. The 256 QAM modulator outputs 256 QAM points to a summer. Another data modulator receives additional data to be transmitted in a separate, substantially less complex constellation. This modulator processes the additional data to do forward error correction thereon and then maps the encoded data into a less complex constellation such as QPSK, 16 QAM etc. The additional data constellation points are then amplified in a variable gain amplifier and fed to a summer where each additional data point is added by vector summation to one 256 QAM point. The output 1024 QAM point is filtered and shifted to the desired transmission frequency. Legacy cable modem receivers can still receive the 256 QAM point since the addition of the new data just appears to be noise which they can overcome using the parity bits encoded in the transmitted symbols. 1024 QAM cable modem receivers receive both the 256 QAM points and the new data points and output both.

21 Claims, 5 Drawing Sheets

NEW DATA MODULATOR

NEW 1024 - QAM RECEIVER

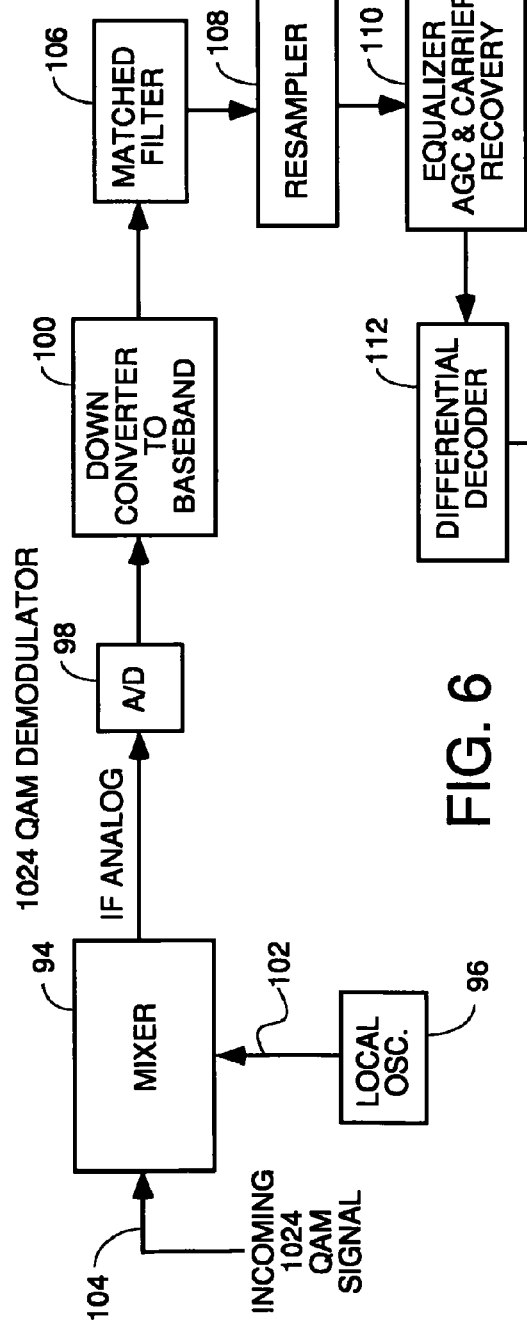
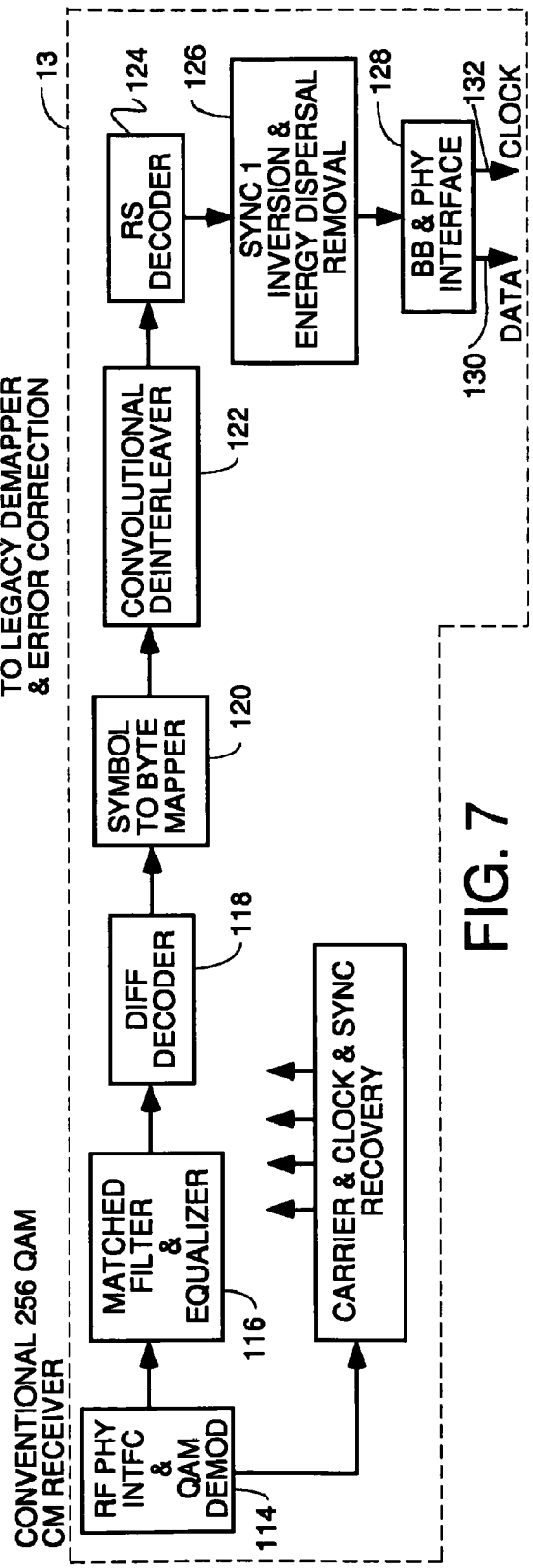
FIG. 6
FIG. 7

SIMPLIFIED VERSION
OF QPSK RECEIVER

DOWNSTREAM TRANSMITTER AND CABLE MODEM RECEIVER FOR 1024 QAM

BACKGROUND OF THE INVENTION

Existing cable television systems have recently been used to deliver digital data in addition to analog television broadcasts. The digital data is delivered by modulating it onto a radio frequency carrier using any one of a number of different modulation schemes. The data can be anything such as digitized video, telephone calls, broadband internet access, etc.

Cable Labs is an industry consortium of cable system operators which develops standards for the transmission of digital data over hybrid fiber coaxial cable (HFC) of CATV systems. Cable Labs also certifies equipment such as cable modems and head end transceivers developed by various vendors as either being in compliance or not being within compliance with Cable Labs standards.

Cable Labs has previously developed the DOCSIS 1.0 and 1.1 standards for transmitting digital data over cable. Many cable systems exist which have deployed cable modems which comply with these DOCSIS 1.0 and 1.1 standards. The most complex constellation, i.e., modulation type, which these DOCSIS 1.0 and 1.1 cable modems were designed to receive in the downstream is 256-QAM. QAM stands for Quadrature Amplitude Modulation and encodes bits into constellation points each of which has a phase and a magnitude. The phase or angle of the constellation point from the origin defines the values of certain bits in the vector which defines the constellation point. The amplitude of the vector to that constellation point defines the values of other bits in the vector which defines the constellation point.

As the services which are to be delivered over HFC get more complex and multimedia rich, more data must be sent. There are only two choices to send more data on a radio frequency carrier: raise the symbol rate (the clock rate defining the interval during which each symbol or constellation point is modulated onto the carrier); or use a more complex constellation to send more data during each symbol time but still using the same symbol rate.

Unfortunately, raising the symbol rate is not a good option in most cable systems because raising the symbol rate also raises the bandwidth consumed by the RF signal, and the bandwidth is a limited resource pool.

In QAM modulation, the magnitude and phase information of each symbol are represented by different bits of the symbol. Each of these sets of bits can be translated into an analog value which represents the values of those binary bits in a base 10 numbering system. The analog values for the magnitudes of each symbol are used to amplitude modulate a first radio frequency carrier during different segments of time representing the symbol periods. In other words, during each symbol period, the analog value of the magnitude of a corresponding symbol or constellation point is used to amplitude modulate the RF carrier. Likewise, the analog value of the phase bits of each symbol is used to amplitude modulate a second RF carrier which has the same frequency as the first RF carrier but which is 90 degrees out of phase therewith. Hence the term quadrature amplitude modulation.

When the symbol rate is increased, the spacing between the changes in amplitude becomes smaller. This increases the bandwidth consumed by the signal. If these high frequency components are cut off in the receiver passband filters, the received signal will be distorted in shape. This will cause bit errors in the received signal.

Therefore, a need has arisen for a method and apparatus that allows more data to be sent without raising the symbol rate using a 1024-QAM constellation, and which allows the legacy cable modems which are already deployed and which can only receive at most 256-QAM modulated signals to still be used in the same logical channel with newer modems which can recover data from 1024-QAM constellation points.

SUMMARY OF THE INVENTION

The genus of the invention is defined by the characterizing feature that an additional constellation point defined by a vector in a somewhat less complex constellation point is "piggybacked" on each 256-QAM constellation point transmitted downstream in cable systems populated with older DOCSIS 1.0 and 1.1 modems. This is done in such a way as to not render the DOCSIS 1.0 and 1.1 modems inoperative to receive the 256-QAM DOCSIS 1.0 and 1.1 constellation points. Newer cable modems designed to receive these more complex constellation points receive both the 256-QAM constellation points as well as the additional constellation point that is piggybacked on each 256-QAM constellation point.

To generate the new more complex constellation, a 256-QAM mapper maps the DOCSIS 1.0 and 1.1 data (after suitable processing to provide noise immunity such as interleaving, forward error correction encoding, etc.) to 256-QAM constellation points. The new data to be sent is mapped into a less complex constellation point such as a QPSK or 16-QAM point after processing to provide noise immunity such as interleaving and forward error correction encoding. The new data constellation points are then amplified in a variable gain amplifier and fed to one input of a summer. The other input of the summer receives a 256-QAM constellation point for every new data constellation point. The summer performs a mathematical vector addition of the 256-QAM constellation point with the new data constellation point, each of which is represented by a complex number, to generate a new constellation point called a 1024 QAM constellation point. The resulting data is then passed through a shaping filter to satisfy the Nyquist criteria and limit the bandwidth of the resulting data to the allotted 6 MHz channel.

Any constellation and modulation type can be used for the new data so long as the legacy DOCSIS 1.0 and 1.1 cable modems have adequate signal-to-noise ratio to receive the old 256-QAM points in the presence of the noise created by the addition of the "piggyback" constellation point. That is, the signal-to-noise ratio (SNR) is important because the vector addition of the new constellation point to the 256-QAM point appears to the legacy modems as noise corruption of the 256-QAM point. This noise corruption must be overcome by the noise suppression and error correction circuitry of the legacy cable modem receiver using the forward error correction encoding with error detection and correction bits.

There is a minimum SNR that legacy DOCSIS 1.0 and 1.1 modems must have to reliably receive points in the 256-QAM constellation. That channel SNR must be improved when the new data is encoded in QPSK points and added to the 256-QAM points.

The additional SNR for the legacy DOCSIS 1.0 and 1.1 modems is necessary because the distance between the 256-QAM points in the 256-QAM constellation is reduced by the addition of the new data constellation points when transmitting 1024 QAM points. Additional SNR is required to correctly distinguish between different noise corrupted 256 QAM points which are now spaced closer together. The actual additional SNR needed by the legacy DOCSIS 1.0 and 1.1 modems to receive the noise corrupted 256-QAM points depends upon several factors. Those factors are: the number of points in the new data constellation; the gain of the variable gain amplifier in the new data modulator feeding the summer and the degree of excellence of the equalizer, automatic gain control circuit, timing recovery and carrier recovery circuits in the DOCSIS 1.0 and 1.1 cable modem receiver.

The additional SNR can be achieved by both improving the quality of the circuitry in the DOCSIS 1.0 and 1.1 modems or by making improvements in the CATV HFC system itself. It is not desirable to have to improve the circuitry of the DOCSIS 1.0 and 1.1 modems since they are already deployed, so the preferred way is to improve the HFC system itself in which the 1024 QAM technology is deployed. For example, SNR increases can be achieved by reducing the number of users on the cable TV system, increasing the length of the fiber optic portion of the HFC relative to the coaxial portion, shortening the HFC length from the most remote user to the headend, and properly terminating all unused taps on the HFC system to minimize reflections from impedance mismatches.

The legacy modems can only receive the legacy data and output it and the new data is lost. However, cable modems designed to receive the 1024 QAM data can receive and output both the legacy 256 QAM data and the new data on separate outputs.

To receive the new data and the old data in a new modem within the genus of the invention, the received radios frequency signal is first processed in a 1024 QAM demodulator. Then legacy demapping and error correction circuitry recovers the old data and outputs it. The old data is then passed through an error correction encoder and mapper that regenerates 256 QAM points from the recovered data. This is done by doing the same thing to the data that the transmitter at the head end did to generate the 256-QAM constellation points that were applied to the summer at the head end. These newly generated 256 QAM constellation points are then applied to the subtraction input of a summer or other mathematical processing unit in the new modem. The summer or mathematical processor does vector subtraction to subtract these re-generated 256 QAM points from the 1024 QAM points. Prior to supplying them to the summer, the 1024 QAM points are subjected to a delay that equals the time it takes for the legacy demapper and legacy error correction encoder and mapper to process the data of one constellation point passing through them. The output from the subtraction operation is applied to a demapper of a type suitable to demap the constellation points, i.e., to recover the data used to generate the new data constellation points. The output is the new data points.

In the preferred embodiment, the new modem receiver will have the following characteristics. Either a single equalizer which is shared between the 256-QAM data path and the new data path or separate equalizers, one on each path will be used. These equalizers will have more taps than the prior art equalizers in DOCSIS 1.0 or 1.1 modems, and each tap will have more bits that define the tap weight. The analog-to-digital (A/D) converter will have higher resolution and output more bits per sample than the prior art A/D converter. The timing recovery, automatic gain control and carrier recovery loops will make corrections in smaller, discrete steps thereby achieving better resolution. The Reed-Solomon decoder will use better error correction block codes or Turbo code or the block code will be concatenated with Trellis convolutional code used to encode each symbol.

BRIEF DESCRIPTION OF THE DRAWINGS

FIG. 6 is a block diagram of one embodiment for the 1024 QAM demodulator circuit 80.

FIG. 7 represents in block diagram form an example of receiver circuitry that is used to perform the functions of the 1024 QAM demodulator 80 and legacy demapper and error correction decoder 82 in dashed block 92 of the 1024 QAM receiver shown in FIG. 5 if the head end transmitter for the legacy data takes the form of the circuit of FIG. 2.

DETAILED DESCRIPTION OF THE PREFERRED EMBODIMENT

Figure 1:
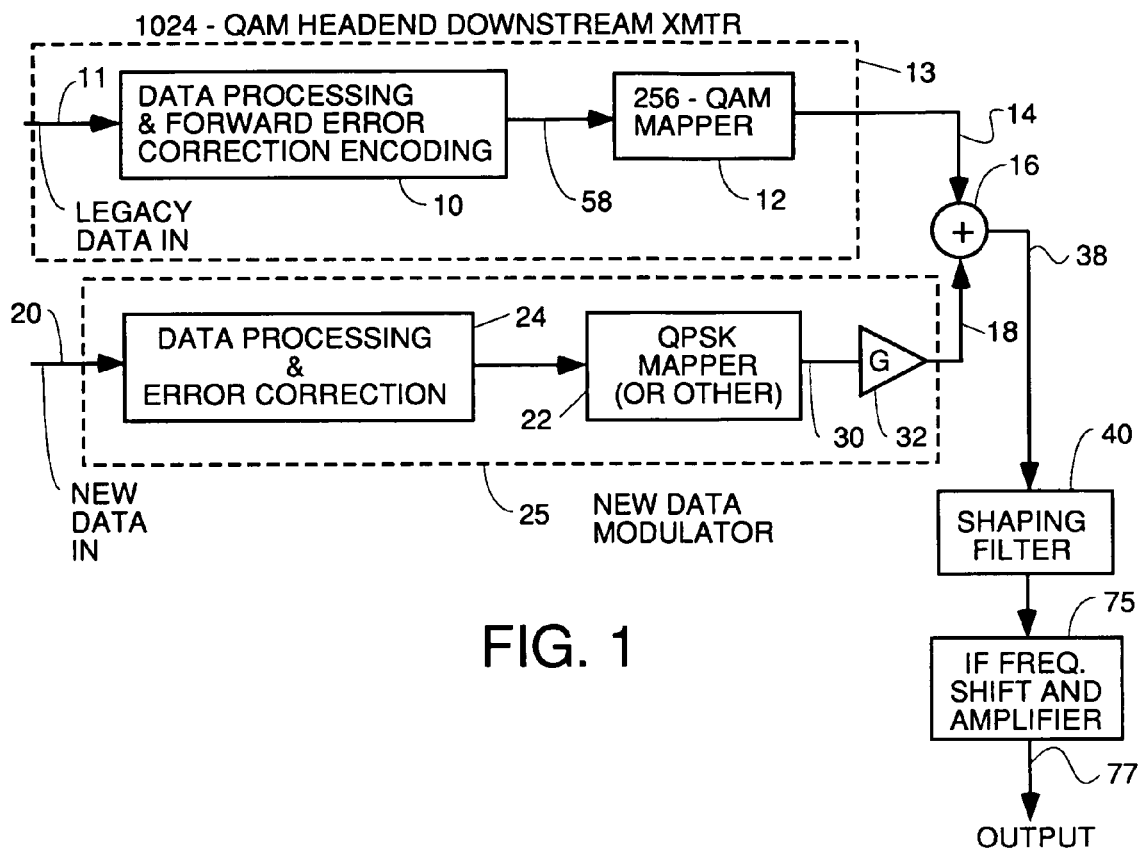
FIG. 1 is a block diagram of a 1024 QAM headend downstream transmitter according to one embodiment of the invention.

Referring to FIG. 1, there is shown a block diagram of the preferred embodiment of a 1024 QAM headend downstream transmitter. Block 10 represents the conventional data processing and forward error correction encoding modulator of a conventional, legacy 256 QAM headend transmitter represented by block 13 and defined in the DOCSIS standard such that legacy DOCSIS 1.0 or 1.1 cable modems could receive data modulated by this transmitter. It is part of the invention to not change the circuitry of the legacy downstream transmitter 13 so as to not render obsolete the legacy cable modems which will be on the same logical channel as the logical channel as the 1024 QAM newer cable modems.

This downstream transmitter circuitry 13 receives raw data to be transmitted and converts it into a forward error corrected, interleaved stream of Reed Solomon blocks ready to be broken up and mapped into 256 QAM symbols. This circuitry is known and need not be modified for use in this invention. Such circuitry is described in standard J.83 of the International Telecommunications Union of Series J: Transmission of Television, Sound Programme and other Multimedia Signals and entitled "Digital Multi-Programme Systems for Television, Sound and Data Services for Cable Distribution" (published in April of 1997) which is hereby incorporated by reference. This standard covers the framing structure, channel coding and modulation of digital multi-programme (multimedia) signals for television, sound and data services distributed over HFC systems. The function of block 10, in the preferred embodiment, is: to receive a prior art modified MPEG-2 transport stream containing compressed data encoding video, audio and other data; randomize the data; do forward error correction encoding on the randomized data to generate Reed-Solomon blocks encoded with error detection and correction ECC bits; convolutionally interleave the Reed-Solomon blocks; and differentially encode the data prior to passing the data to a 256 QAM mapper 12. The combination of block 10 and block 12 will be referred to in the claims as a 256 QAM modulator.

Figure 2:
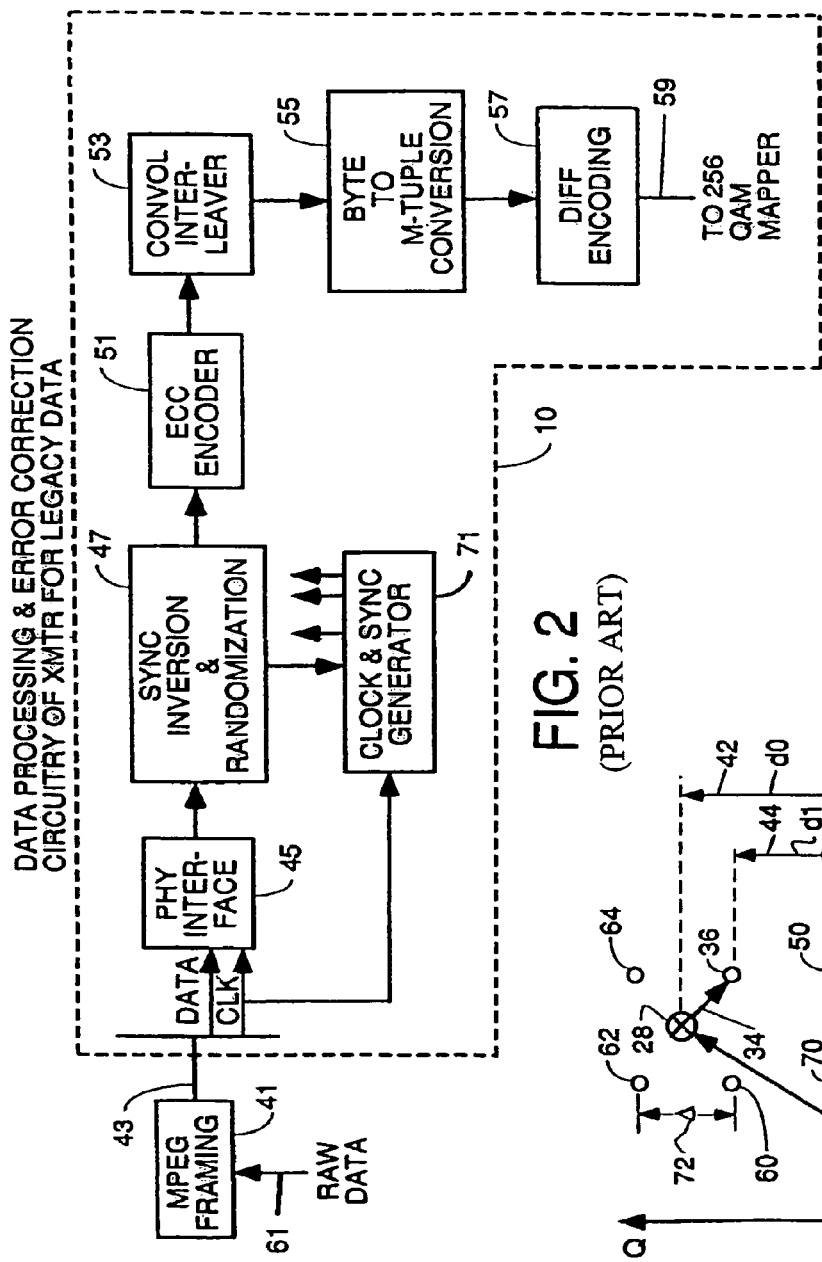
FIG. 2 is a block diagram of the prior art headend downstream 256 QAM transmitter circuitry of one embodiment of block 10 in FIG. 1.

Before discussing the rest of the head end transmitter, more detail on the circuitry of block 10 will be given. Referring to FIG. 2 there is shown a block diagram of the headend downstream 256 QAM transmitter circuitry which is the preferred embodiment of block 10 circuit in FIG. 1. This circuitry implements the basic circuitry defined in the standards relied upon by the DOCSIS standards committee and published by the International Telecommunications Union as the ITU-T J.83 standard, Appendix A, which is hereby incorporated by reference. The circuitry in FIG. 2 is not modified from currently used 256 QAM headend transmitters in the prior art.

FIG. 2 represents the headend downstream transmitter defined in FIG. A.1 of the J.83 standard as explained in the text of the standard pertaining to that figure. A similar implementation of the data processing and error correction code can be used for the new data modulator 25 in FIG. 1, but modified to improve the forward error correction (FEC) capability to enable the new 1024 QAM cable modems to receive the 1024 QAM constellation points in the presence of "noise" created by the 256 QAM payload data constellation points. Those modifications can be use of improved Reed Solomon (RS) encoding alone (smaller block size, etc.) or it can be used in combination with a QPSK mapper 22 which implements Trellis Code Modulation (TCM) to add redundant bits to assist a Viterbi decoder in the receiver divine what payload data was sent. In another alternative embodiment, TCM modulation alone can be used and ECC encoder 51 can be omitted with a corresponding change at the receiver to remove the RS decoding circuitry. The ECC encoder 51 functions to create Reed Solomon (RS) blocks encoded with ECC bits to detect and correct errors. The preferred structure is to use RS encoding in conjunction with TCM. If RS encoding or other block encoding is used to improve the Forward Error Correction (FEC) capability, these modifications affect the structure of the Error Correction Bit (ECC) encoder 51. Any block code may be used for ECC encoding, but Reed Solomon encoding is specified in the standard. In the best embodiment, ECC encoder 51 is implemented as a Turbo Code encoder. In these embodiments, the Turbo Code encoding would be substituted for Reed Solomon encoding in block 51 and Trellis Code Modulation would not be done in QPSK mapper 22 in FIG. 1.

The main point is that the 256 QAM coding scheme is unchanged. That is, the forward error correction scheme of the 256 QAM transmitter that encodes the legacy data into 256 QAM points is unchanged so that the legacy 256 QAM cable modems listening on the same channel as the 1024 QAM cable modems are not rendered obsolete. What is changed is the coding of the "new data" into 1024 QAM points.

Block 41 represents the headend transmitter's conventional MPEG framing circuitry which compresses downstream data into MPEG frames and assembles MPEG transport streams on line 43. These MPEG transport streams are used to encapsulate video, audio, broadband internet data and data of any other services, all received on line 61 from satellite signals, contribution links or local servers that provide the downstream data.

The MPEG transport streams on line 43 are received with a clock signal by a PHY interface circuit 45. The PHY or baseband interface circuit 45 may be a local area network interface card if the MPEG transport streams are encapsulated in LAN packets or circuitry suitable to receive the MPEG transport streams. Circuit 45 functions to adapt the data structure to the format of the signal source. The framing structure which is output is in accordance with MPEG-2 transport layer including sync bytes.

Sync inversion and randomization circuit 47 inverts the sync 1 bit according to the MPEG-2 framing structure, and randomizes the data stream to break up long runs of 0s and 1s for spectrum shaping purposes.

The ECC encoder 51 takes the randomized data from the transport stream and puts the data into codewords such as Reed-Solomon blocks and applies an error correction polynomial to each code word to generate ECC bits which are appended to the code word to generate error protected packets. The encoding is also applied to the sync byte itself.

A convolutional interleaver 53 performs a depth I=12 convolutional interleaving of the error protected packets. The periodicity of the sync bytes remains unchanged.

A byte to m-tuple conversion is carried out in block 55 to convert the bytes generated by the interleaver into QAM symbols.

Finally, to get a rotationally invariant constellation, differential encoding of the two most significant bits of each symbol is performed in block 57. The output on line 59 is applied to the 256 QAM mapper.

Block 71 generates the clock and synchronization signals needed by the transmitter circuitry in FIG. 2.

In some embodiments, the 256 QAM mapper is a Trellis Code Modulator which encodes data on line 59 with additional, redundant error correction bits and maps the payload data and redundant bits into 256 QAM constellation points.

Figure 4:
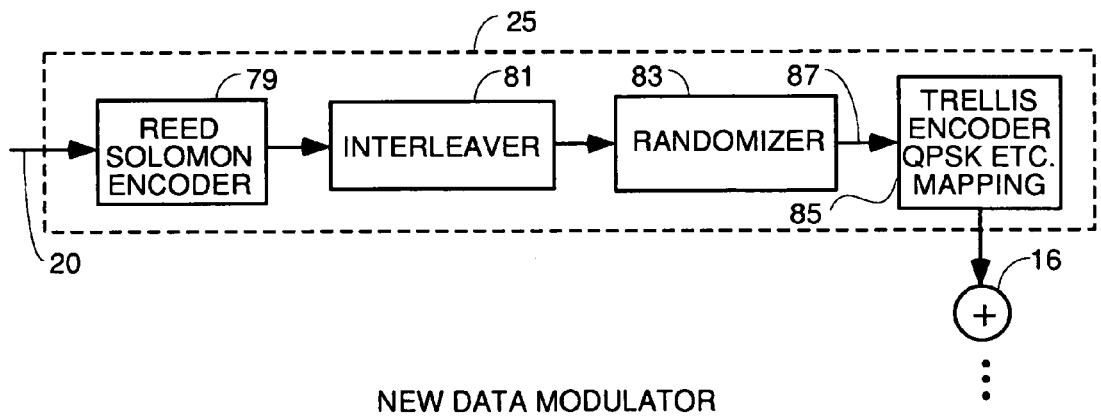
FIG. 4 is a block diagram of an embodiment for the circuitry within dashed line 25 of FIG. 1 for the headend downstream transmitter portion that maps the new data into QPSK or other type constellation points for addition to the legacy data 256 QAM constellation points.

FIG. 4 is a block diagram of an embodiment for the circuitry within dashed line 25 of FIG. 1 for the headend downstream transmitter portion that maps the new data into QPSK or other type constellation points for addition to the legacy data 256 QAM constellation points. This circuitry is similar to the circuitry of block 13 in FIG. 1, but has a more powerful RS encoder 79 and Trellis Encoder 85. The new data enters on line 20 and is Reed Solomon encoded in block 79, preferably using a smaller block size and more powerful T value than is used in block 10 of FIG. 1. An interleaver 81 then interleaves the RS codewords output by block 79 and a randomizer 83 pseudorandomly scrambles the data in the interleaved RS blocks. In some embodiments, the randomizer randomizes the data before the Reed Solomon encoder encodes it into codewords. Finally, a trellis encoder 85 Trellis encodes groups of randomized bits on bus 87 into QPSK constellation points (or whatever other constellation is used) for output to the summer 16. These four circuits represent four layers on the transmit side of the forward error correction scheme. Four corresponding layers (not shown) exist at the CM receiver in 1024 QAM constellations. In other words, at the CM receiver, four corresponding circuits undo what the corresponding circuit on the transmitter side did. For example, in the CM receiver, a Trellis decoder (not shown) decodes each constellation point into the bits that were encoded into the constellation point using the redundant bit or bits to detect and correct errors. A derandomizer circuit (not shown) derandomizes the bits output by the Trellis decoder. A deinterleaver (not shown) deinterleaves the RS codewords output by the derandomizer, and a Reed-Solomon decoder, uses the error detection and correction bits of each RS code word to detect and correct errors and outputs the original bit sequence that entered the transmitter. Each of the circuits in FIGS. 2 and 4 are conventional and need no further details here.

Returning to the consideration of FIG. 1, block 12 represents a prior art 256-QAM mapper that functions to receive the data output from the data processing and error correction circuitry 10. The function of this circuit is to map groups of data bits received on line 59 from the output stage differential encoder 57 in FIG. 2 into constellation points of a 256-QAM constellation. The resulting constellation points are output on bus 14 as I and Q values (each constellation point is a complex number represented by an inphase or I value and a quadrature or Q value) for use in quadrature amplitude modulation, the I value modulating the amplitude of one carrier and the Q value amplitude modulating the quadrature carrier of the same frequency but 90 degrees offset in phase.

Bus 14 is coupled to one input of a summer 16. The other input of the summer is bus 18 which carries the I and Q vectors of each constellation point of the new data which arrives on bus 20. The function of the summer 16 is to calculate the vector sum of each 256 QAM constellation point vector with a corresponding constellation point generated from the new data. Each new data constellation point alters the position of one 256 QAM point in a way the reflect the I and Q values of the new data point vector as will be explained below.

The new data constellation points on bus 18 are generated by a prior art mapper 22, which in this embodiment is chosen as a QPSK mapper. Any other type of mapper such as 16 QAM, 64 QAM etc. may also be used as long as it can be decoded at the new receiver.

The new data entering on bus 20 is, in one embodiment, subjected to the same type forward error correction encoding as the legacy data using the same block size for RS codewords (or some other codeword block size), the same code and the same Trellis encoding. This processing is done in data processing and error correction circuit 24. It is not required that the same processing be done on the new data as is done on the legacy data. It is only necessary that sufficient forward error correction processing be done to allow the new data to be properly received. The type of processing carried out in blocks 10 and 24 need not be the same, and only the minimum amount of such noise combatting techniques need be used. In noisier HFC systems, it is usually desirable to use more aggressive forward error correction techniques in circuit 24. The FEC techniques in circuit 24 may be more aggressive or just different than the FEC techniques in circuit 10. For example, the block sizes of the RS code words may be decreased and more error correction bits per code word may be used in circuit 24. Also, a better error correction code such as Turbo code may be used in block 24 to encode the code words with error correction bits. Turbo codes are known in the prior art, and perform better than Reed Solomon codes. Further, more redundant bits per constellation point may be added by the Trellis encoder in block 24 or a different Trellis encoder may be used since its output is 4 possible QPSK points for the new data as opposed to 256 different possible QAM points for the legacy data.

Better error correction codes, such as Turbo codes, when used to encode the code words of the new data, allow the new data points to be spaced closer together without increasing the bit error rate in recovery of the legacy data. This means more complex new data constellations can be used, and greater throughput can be achieved.

Figure 3:
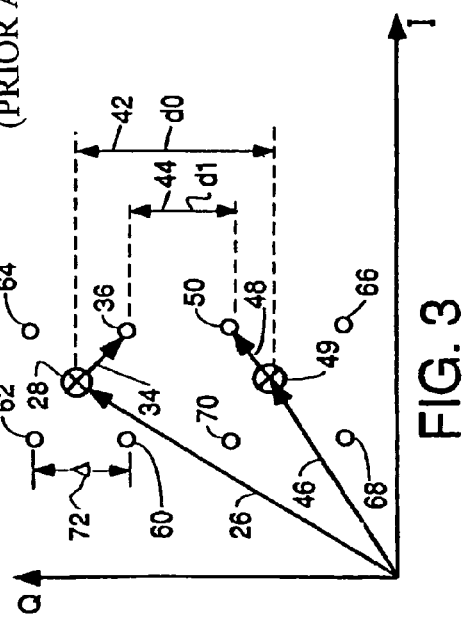
FIG. 3 is a diagram showing the 256 QAM constellation points as Xs and the possible new data points around each 256 QAM constellation point as small circles.

The concept of noise corruption of the legacy data by the addition of the new data is illustrated in FIG. 3. FIG. 3 is a diagram showing the 256 QAM constellation points as Xs and the possible new data points around each 256 QAM constellation point as small circles. For example, suppose one legacy data constellation point on bus 14 in FIG. 1 is represented by I and Q vectors which combine to define the vector 26 defining 256 QAM constellation point 28. Suppose also that a new data point which is QPSK modulated is output from QPSK mapper 22 on bus 30 and is amplified in variable gain amplifier 32 and input to summer 16 on bus 18. The new data QPSK constellation point is represented by vector 34. Note that the new data can be modulated into any less complex constellation than a 256 QAM constellation and summer 16 will simply do a vector sum of each 256 QAM symbol with a symbol from the less complex constellation. In the claims, the data on line 18 is referred to as new data symbols regardless of the type of modulation or the complexity of the new data constellation. Note also that the programmable gain provided by variable gain amplifier 32 allows the amount of "noise" generated by "piggybacking" the new data point on the legacy data 256 QAM point. This is an important feature since it allows the distance between the 1024 QAM points to be increased by reducing the gain of amplifier 32 if the legacy modems are having problems receiving the 256 QAM points. Conversely, if the HFC system is quiet and the legacy modems are having no problems receiving the 256 QAM points, the gain of amplifier 32 can be increased to make it easier for the new 1024 QAM modems to receive both the 256 QAM points and the 1024 QAM new data points.

The summer 16 does the vector addition of vectors 26 and 34 to generate an output 1024 QAM constellation point 36 on bus 38. This data on bus 38 is then filtered in a shaping filter 40, typically a square root raised cosine filter which may also do downstream equalization in some embodiments.

Note that original distance between 256 QAM constellation points, without the addition of the new data points, is represented by distance 42 in FIG. 3. When the new data points are added, the minimum distance that may result between adjacent constellation points which may be generated is reduced to the distance d1 shown at 44. The distance d1 is the minimum distance between points 36, 60, 62 and 64 in the cluster of 1024 QAM points surrounding 256 QAM point 28 and the points 50, 66, 68 and 70 in the cluster of 1024 QAM points surrounding 256 QAM point 49. Changing the gain of variable gain amplifier 32 in FIG. 1 alters the length of vectors 34 and 48 thereby altering the distance d1 and making it easier or more difficult for the legacy modems to received the legacy 256 QAM points 28 and 49 because of the noise caused by adding the new data vector to the 256 QAM vector. In other words, the 256 QAM point 28 is moved to one of the 1024 QAM points 36, 60, 62 or 64 by addition of the new data, and this displacement represents noise that must be ignored by the legacy receivers in order to find the correct magnitude and phase of the vector 26 defining the position of 256 QAM point 28. Increasing the gain of the variable gain amplifier 32 in FIG. 1 increases the displacement and makes it more difficult for the legacy receivers.

For example, suppose the first 256 QAM vector 26 is added to a new data point vector 34 to generate 1024 QAM data point 36. Suppose the next 256 QAM data point represented by vector 46 is combined with a vector 48 to generate 1024 QAM data point 50. The distance between these two data points is represented by arrow 44 (d1) which is shorter than arrow 42 (d0) representing the minimum distance between 256 QAM constellation points where no new 1024 QAM data point is added.

The decrease in distance between d0 and d1 represents additional signal-to-noise ratio that the legacy modems must have to successfully receive the 256 QAM points in the presence of the noise created by the 1024 QAM points. The legacy modem designs are fixed and cannot be changed. This is the reason the HFC system must be improved to provide additional signal-to-noise ratio for the DOCSIS 1.0 and 1.1 receivers so they can properly receive the 256 QAM points. The HFC system can be made cleaner to supply the needed additional SNR by making it shorter, having fewer customers, making the fiber portion longer, using better or more amplifiers, terminating unused taps to prevent reflections, etc.

The SNR loss represented by the reduction of distance between adjacent constellation points from d0 to d1 in FIG. 3 is given by the following equation:

$$SNR \text{ loss} = 20\log\left(\frac{d_1}{d_0}\right) = 20\log\left(\frac{d_0 - \Delta}{d_0}\right). \quad (1)$$

expressed in dB

The result of Equation (1) represents the amount of SNR that is lost because of the non ideal transmitter with its 256 QAM constellation "corrupted" by the additional modulation of the new data. The lost SNR should be gained by cleaning up the HFC system to provide both reliable reception of the 256 QAM points by the legacy modems as well as reliable reception of the 1024 QAM points by the new cable modems.

If all the additional constellation points are divided evenly and have the same distance from each other, then $$\Delta = \frac{d_0}{2} \quad (2)$$

and equation (1) gives a 6 dB loss in SNR caused by the addition of the new data constellation points to the 256 QAM points. If cleaning up the HFC system is not enough, it is still possible to provide reliable reception of the 256 QAM points by the legacy cable modems by decreasing the gain of amplifier 32 in FIG. 1.

In light of equation (1), the quality of the HFC channel must be improved enough to provide the additional SNR to the legacy DOCSIS 1.0 and 1.1 receivers to properly receive the 256 QAM points. The new cable modems designed to receive both the 256 QAM points and the new data, can have their equalizers, automatic gain control, symbol clock timing recovery and carrier recovery circuits specifically designed to provide the additional SNR needed to extract the 256 QAM points and to receive the new data. Such improvements are well within the skill in the art. Examples of such improvements are the following. First, the A/D circuit to digitize the received analog signal can be improved to output more bits per sample to give better resolution. Likewise, the equalizer can have more taps and each tap can be defined with more bits to give better equalization performance. The timing recovery and carrier recovery loops and the automatic gain control loop can be improved to have more resolution by using smaller adjustment steps in stabilizing the PLL to lock onto the desired reference so as to provide greater accuracy of the recovered symbol clock and the locally generated carrier signal which is synchronized to the master carrier transmitted from the CMTS. Likewise, the AGC, i.e., rotational amplifier and AGC amplifier loops can use smaller adjustment steps to more accurately lock onto the data to generate more correct error correction factors thereby improving the accuracy and resolution of the corrections to the transmitted data points using these error correction factors.

The bit error rates in the legacy data will depend upon the quality of the HFC system, the quality of the circuitry in the new receiver preceding the error detection and correction circuitry and the complexity of the new data constellation and how much the new data reduces the distance $d_0$ in FIG. 3. In some embodiments, improvements that can be made to the error detection and correction circuitry used to receive the new data include: use of concatenated convolutional or Trellis codes and block codes such as Reed-Solomon codes; use of a greater T value to add more error correction bits to each RS codeword to give a greater range of errors that can be detected and corrected; and, use of smaller number of payload data bytes in the RS codewords. Further, some error correction codes, such as Turbo Codes, work better than others, so better codes and better polynomials to generate the ECC bits may be used to reduce the bit error rate on the QPSK data. It is possible, depending upon all the factors identified above that convolutional encoding concatenated with block codes will not be necessary or that the T value and number of payload data bytes can be decreased or even increased or using Turbo Code for the new data relative to the legacy data. Everything is a tradeoff, so those skilled in the art can simply balance the various factors to get suitable performance given the constellation chosen for the new data and the quality of the HFC system.

The stream of output constellation points on bus 38 in FIG. 1 defines a waveform which has a bandwidth which must be restricted to the 6 MHz allowable bandwidth (or 8 MHz in Europe) of the channel. This is done in conventional shaping filter 40. This shaping filter has a square root raised cosine transfer function with a bandwidth limited to 6 MHz and an alpha factor specified in the DOCSIS standards.

The output of the shaping filter is modulated onto the correct downstream carrier frequency and amplified to a suitable transmit power by an IF frequency translator and amplifier 75 which outputs the downstream RF signal to be transmitted on line 75 which is coupled to the HFC system. This is the actual signal bearing the 1024 QAM constellation points that is transmitted. The legacy receivers DOCSIS 1.0 and 1.1 receivers must extract the 256 QAM point 28 from it and the new receivers extract the 256 QAM point and the 1024 QAM point from each constellation point modulated onto this downstream signal on HFC 77.

Figure 5:
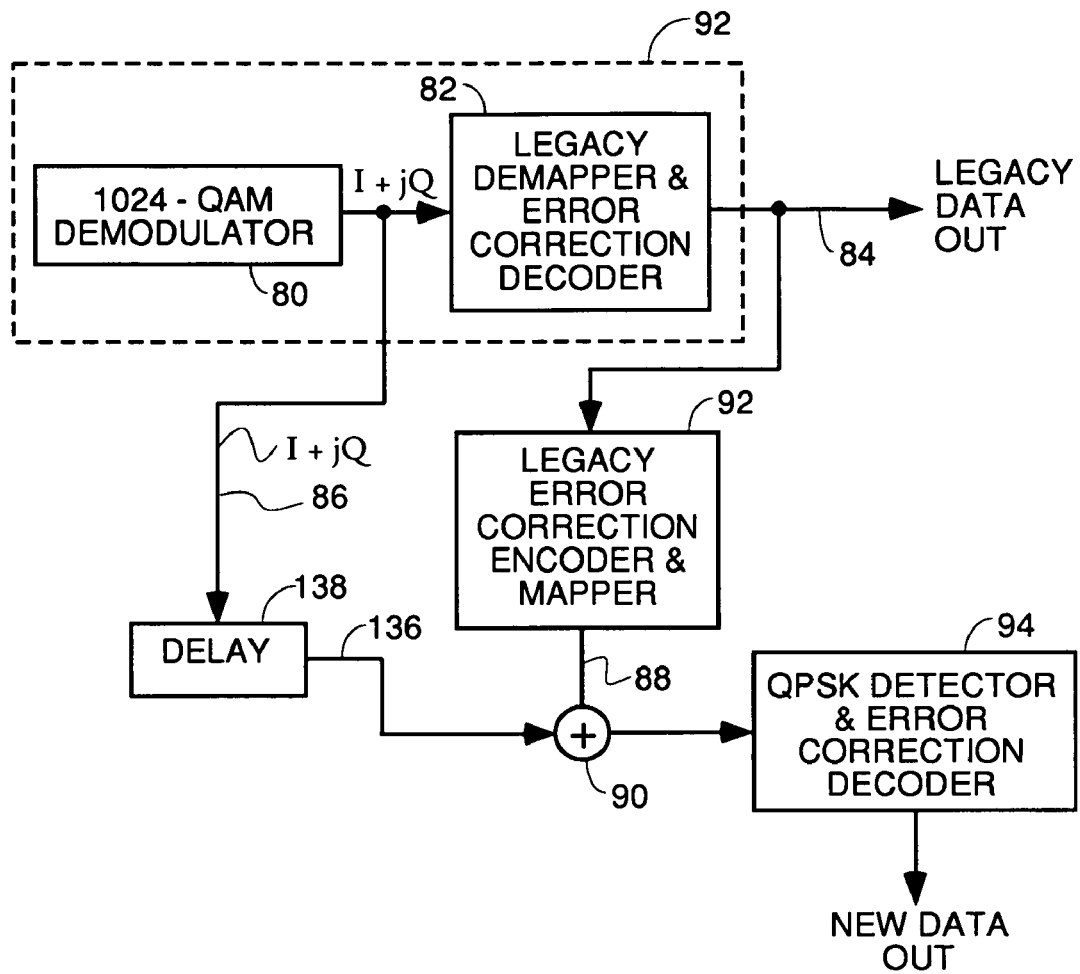
FIG. 5 is a block diagram of the new 1024 QAM cable modem receiver design.

Referring to FIG. 5, there is shown a block diagram of a 1024-QAM receiver design which can recover both the legacy data and the new data modulated onto the legacy data constellation points.

1024 QAM Demodulator Circuit 80

A 1024 QAM demodulator circuit 80 uses known circuitry to down convert the incoming RF signal to baseband and convert it to digital samples, perform filtering, equalization filtering, automatic gain control, timing recovery, and carrier phase and frequency recovery. Any known circuitry that can perform these functions will suffice to practice the invention, and specific examples of such circuits are described below.

FIG. 6 is a block diagram of one embodiment for the 1024 QAM demodulator circuit 80. Mixer 94, variable frequency local oscillator 96, analog-to-digital converter 98 and down converter 100 combine to down convert the frequency of the incoming RF signal to baseband and convert it to digital samples. Variable frequency local oscillator 96 is tuned to generate a local oscillator signal on line 102 that feeds one input of mixer 94. The other input 104 is fed by the RF signal carrying the 1024 QAM signal. The mixer down converts the frequency of the incoming RF signal down to an IF frequency. The channel of interest might have a center frequency anywhere in a wide band of frequencies, so the local oscillator is tuned to move the center frequency of the desired channel down to a fixed IF frequency. The A/D converter 98 then samples this IF frequency at a high enough rate to insure adequate sampling of the highest sample rate channel. Down converter 100 functions to down convert the IF signal represented by the sample stream output by A/D converter 98 to baseband where it is filtered by a matched filter 106.

The matched filter 106 is used to detect the pulses of the payload data modulation in the presence of additive white noise. Digital data has a broad spectrum with a significant low frequency content. Baseband transmission of such data therefore requires the use of a low pass channel with a bandwidth large enough to accommodate the essential frequency content of the digital data stream. Typically, however, the channel is dispersive in that its frequency response differs from the ideal low pass filter. The result of data transmission over such a channel is that each received pulse is affected somewhat by adjacent pulses thereby giving rise to what is called intersymbol interference (ISI). ISI is a major source of bit errors in the reconstructed data stream. ISI is controlled by pulse shaping in TDMA transmission. Thus, a square root raised cosine filter is used in the output stage of TDMA transmitters to provide pulse shaping.

Another source of bit errors in baseband data transmission is channel noise. The device which is preferred for optimum detection of a pulse immersed in additive white noise is a matched filter having its impulse response matched to the pulse signal. The matched filter is characterized by a transfer function in the frequency domain which is, except for a delay factor, the complex conjugate of the Fourier transform of the input signal. Such a matched filter optimizes the signal-to-noise ratio of the received signals.

A resampler 108 recovers the symbol clock from the received signal and synchronizes a local symbol clock to the recovered clock, and then uses the synchronized local symbol clock to resample the incoming signal at the correct symbol times to output one or more correctly timed samples per each symbol time.

Equalizer, AGC and carrier recovery circuit 110 processes the burst symbols and develops phase, frequency and gain error offset signals and uses these error signals in a rotational amplifier to correct the phase, frequency and gain offset errors of the received symbols. An equalizer processes the received symbols to develop equalization filter coefficients.

Differential decoder 112 is used to decode differentially encoded DOCSIS 1.0 bursts, but is bypassed otherwise.

Another class of various embodiments of circuits to do each of the functions of the 1024 QAM demodulator and the legacy demapper and error correction decoder 82 in FIG. 5 are given in FIGS. 1-6 of U.S. patent application Ser. No. 09/792, 815, filed Feb. 23, 2001 (TER-013 Jasper I), the entirety of which is hereby incorporated by reference.

To tune to the actual channel on which the signal is to be received, 1024-QAM demodulator typically utilizes a frequency synthesizer (not shown) which generates a tunable local oscillator signal which is applied to one input of a mixer (not shown). The other input of the mixer receives the output signal from the broad bandwidth passband filter. The output of the mixer is then input to a narrow passband bandpass filter (not shown) having fairly sharp rolloff. This filter can be a surface acoustic wave filter or SAW with a linear passband, a sharp rolloff and be approximately phase linear. Since SAWs are not frequency agile as to their center frequency, the center frequency of the channel of interest is tuned to an intermediate frequency which is coincident with the center frequency of the SAW by the frequency agile local oscillator and mixer combination. The SAW removes all signals outside the bandwidth of the channel of interest. The channel of interest may have a more broad bandwidth than 6 MHz in some embodiments, but the bandwidth of the channel is related only to the symbol rate and does not depend upon whether the signal uses a 256 QAM or 1024 QAM etc. constellation.

The output of the narrow passband filter inside the 1024 QAM demodulator is then sampled by an analog-to-digital converter (not shown). In some embodiments, this A/D converter does IF sampling and uses a low jitter sampling clock to reduce phase noise.

Variations on this RF section circuitry of the 1024 QAM demodulator abound, but all filter out extraneous signals, control the gain to the proper level and sample the filtered analog signal to generate digital samples. Some variations include adding an additional low pass filter (not shown) fed by a another mixer which receives a fixed frequency local oscillator signal and functions to down convert the IF frequency output by the first narrow passband filter to a frequency in the passband of the added low pass filter. This added low pass filter filters out noise outside the band of the IF signal. Another variation is to use a bank of digital passband filters, each tuned to a different channel following the AGC amplifier to select the proper channel. The proper filter is digitally selected based upon the channel being received. The output of the selected filter is input to an A/D converter with a fast sample rate that does IF sampling. The samples output by the A/D converter are then mixed in a pair of mixers fed by quadrature frequency agile local oscillator signals (same frequency, but shifted in phase by 90 degrees relative to each other). The purpose of these mixers is to down convert the samples of the IF frequency output by the fixed sample rate A/D converter to a sample stream representing a signal having the desired fixed IF frequency since the frequency of the channel of interest may vary considerably, and this changes the IF frequency of the signal represented by the samples output by the A/D converter. The sample stream output by the mixers are then decimated to remove excess samples given the frequency of the channel being received. The decimated sample stream is then filtered in a digital filter (not shown) having its passband set by the computer (not shown) so as to match the bandwidth of the channel being received.

In some embodiments, the 1024 QAM demodulator 80 will also do narrow band noise excision and impulse noise removal and despreading if the received RF signal is a code division multiplexed signal using known circuitry to perform these functions. Circuitry to do narrow band excision of noise is disclosed in U.S. Pat. No. 6,426,983 which is hereby incorporated by reference. Circuitry to do impulse noise removal is disclosed in a U.S. patent application entitled DETECTION OF IMPULSE NOISE USING UNUSED CODES IN CDMA SYSTEMS, filed Sep. 25, 2002, serial number unknown, which is hereby incorporated by reference and is also disclosed in U.S. patent application Ser. No. 09/792,815, filed Feb. 23, 2001 (TER-013 Jasper I), the entirety of which is hereby incorporated by reference.

The 1024 QAM demodulator then does timing recovery on the sample stream to recover the symbol clock. The timing error in each symbol is then tracked and fed to a local symbol clock as an error correction signal. In some embodiments, the incoming sample stream is resampled at the correct symbol time based upon the correct symbol clock to generate a correctly times, one sample per symbol sample stream.

Next, the sample stream is passed inside the 1024 QAM demodulator to a rotational amplifier (not shown) for carrier frequency recovery and phase and amplitude error adjustments. The amplitude corrections are applied to an automatic gain control amplifier to make amplitude corrections in the symbols. The phase corrections are applied to a carrier recovery tracking loop to correct for phase and frequency offsets of the symbols of the burst. In some embodiments, the rotational amplifier refines the initial phase and amplitude error corrections received from the preamble processor as the symbols of the burst are received.

The symbols, after correction for amplitude and phase errors, are processed by an equalizer circuit (not shown) in the 1024-QAM demodulator.

The tracking loops for timing recovery, and in the rotational amplifier and the equalizer in the 1024 QAM demodulator are preferably improved over their prior art predecessors to improve their performance to handle the 1024 QAM points. These improvements in the timing recovery, rotational amplifier and other tracking loops comprise improving resolution by making corrections in discrete, smaller steps. Likewise, the AND conversion process is preferably improved by outputting more bits per sample. The equalizer can be improved by adding more taps, with each tap having more resolution by defining the weight of each tap using more bits.

Legacy Demapper and Error Correction Decoder

A legacy demapper and error correction decoder contains the rest of the receiver circuitry needed to receive the legacy data, and functions to deinterleave, descramble, differentially decode, Trellis decode and detect and correct the errors in the Reed Solomon code words. Any known circuitry that can perform these functions will suffice to practice the invention. What follows is one example of a circuit for block 82 which can do these above enumerated functions. The circuitry described here is in the prior art and is described in FIG. 6 of U.S. patent application Ser. No. 09/792,815, filed Feb. 23, 2001 (TER-013 Jasper I) which is described in EPO publication number 1235402, published on 28 Aug. 2002, which is hereby incorporated by reference.

A deinterleaver circuit (not shown) in block 82 deinterleaves the data symbols of bursts that were interleaved at the transmitter to defeat burst noise.

A Trellis code modulation decoder (not shown) is used to decode the received symbols that are Trellis code modulated.

In the preferred embodiment, a descrambler (not shown) descrambles any bursts that were pseudorandomly scrambled in the transmitter.

An RS deinterleaver circuit (not shown) deinterleaves the bytes of the RS code words so as to put them back into the order in which they arrived at the RS encoder in the transmitter. The RS deinterleaver improves performance in the presence of impulse noise, but with increased latency. The RS deinterleaver uses the RS encoding parameters in the burst profile data such as the T value and RS codeword length to properly deinterleave the byte stream of RS codewords.

An RS decoder circuit (not shown) receives the Reed Solomon (RS) codewords and uses the parity bits therein to detect and correct any errors. Output of the legacy data is from the RS decoder on line 84.

FIG. 7 represents in block diagram form an example of receiver circuitry that is used to perform the functions of the 1024 QAM demodulator 80 and legacy demapper and error correction decoder 82 in dashed block 92 of the 1024 QAM receiver shown in FIG. 5 if the head end transmitter for the legacy data takes the form of the circuit of FIG. 2. An RF interface and QAM demodulator 114 performs the functions of tuning to the appropriate channel, filtering out noise outside the desired channel, sampling to generate a digital data stream and converting the received signal to baseband. Matched filter and equalizer optimize the signal-to-noise ratio of the received signals and corrects for channel impairments. A differential decoder 118 differentially decodes any differentially encoded constellation points, and a symbol-to-byte mapper 120 assembles the symbols output by the differential decoder into bytes. These bytes are convolutionally deinterleaved in a convolutional deinterleaver 122 back into the Reed Solomon code words which were originally generated in the transmitter. A Reed Solomon decoder 124 then detects and corrects any errors within the range of the coding used using the parity bits of each codeword. A known sync inversion and energy dispersal circuit 126 then performs sync inversion and energy dispersal, and interface circuit 128 outputs the recover 256 QAM data on line 130 and the recovered symbol clock on line 132.

Recovery of the New Data Points

In order to recover the new data points modulated onto the 256 QAM points, the decoded legacy data output on line 84 is re-encoded and mapped to a restored constellation point of the 256 QAM signal. Then the demodulated signal I+jQ on line 86 from the 1024 QAM demodulator is delayed in delay circuit 138 by the amount of time it takes for the processing in the legacy demapper and error correction decoder 82 and the legacy error correction encoder and mapper 92. The delayed result on line 136 is subtracted in a summer 90 from the re-encoded restored 256 QAM constellation point output on line 88 from legacy error correction encoder and mapper circuit 92. The result of the subtraction is demodulated by QPSK detector and error correction decoder 94.

The QPSK detector and error correction decoder 94 is a QPSK receiver (or other prior art receiver for whatever type of modulation is being used to encode the new data into symbols for vector addition to said 256 QAM symbols—hereafter just referred to as a QPSK receiver). This QPSK receiver has improved error correction circuitry which uses improved error correction codes. Preferably Turbo Code is used instead of block coding such as Reed Solomon (RS) encoding, or Trellis Code Modulation (TCM), or both. However, block encoding with smaller block sizes and more error correction and detection (ECC) bits per block of new data can also be used alone or in combination with TCM of the QPSK constellation points, or Trellis Code Modulation of the QPSK points (although QPSK is referred to here, those skilled in the art understand that other constellations and modulation forms can be used so long as they are substantially less complex than 256 QAM) of the new data can be used alone.

The legacy error correction encoder and mapper 92 is the same type circuitry as is used in the transmitter that did the forward error correction processing on the legacy data in the original 256 QAM signal. The QPSK demodulator 94 is a conventional QPSK demodulator but improved in the ways described above to improve its performance in detecting and error correcting the new data. It functions to decode the constellation points into data using a slicer and then regroup the RS codeword byte stream, descramble it if it was scrambled, deinterleave the bytes back into the Reed Solomon code words and use the RS codeword parity bytes to detect and correct any errors. The circuitry in the QPSK demodulator is the receiver side of the forward error correction layer circuitry used in the transmitter to assemble the new data into code words (Reed Solomon or Turbo Code codewords), encode each codeword with error correction bits, interleave the bytes of the codewords, randomize the interleaved byte stream and encode the randomized bit stream into QPSK constellation points or whatever other type of constellation is being used.

Figure 8:
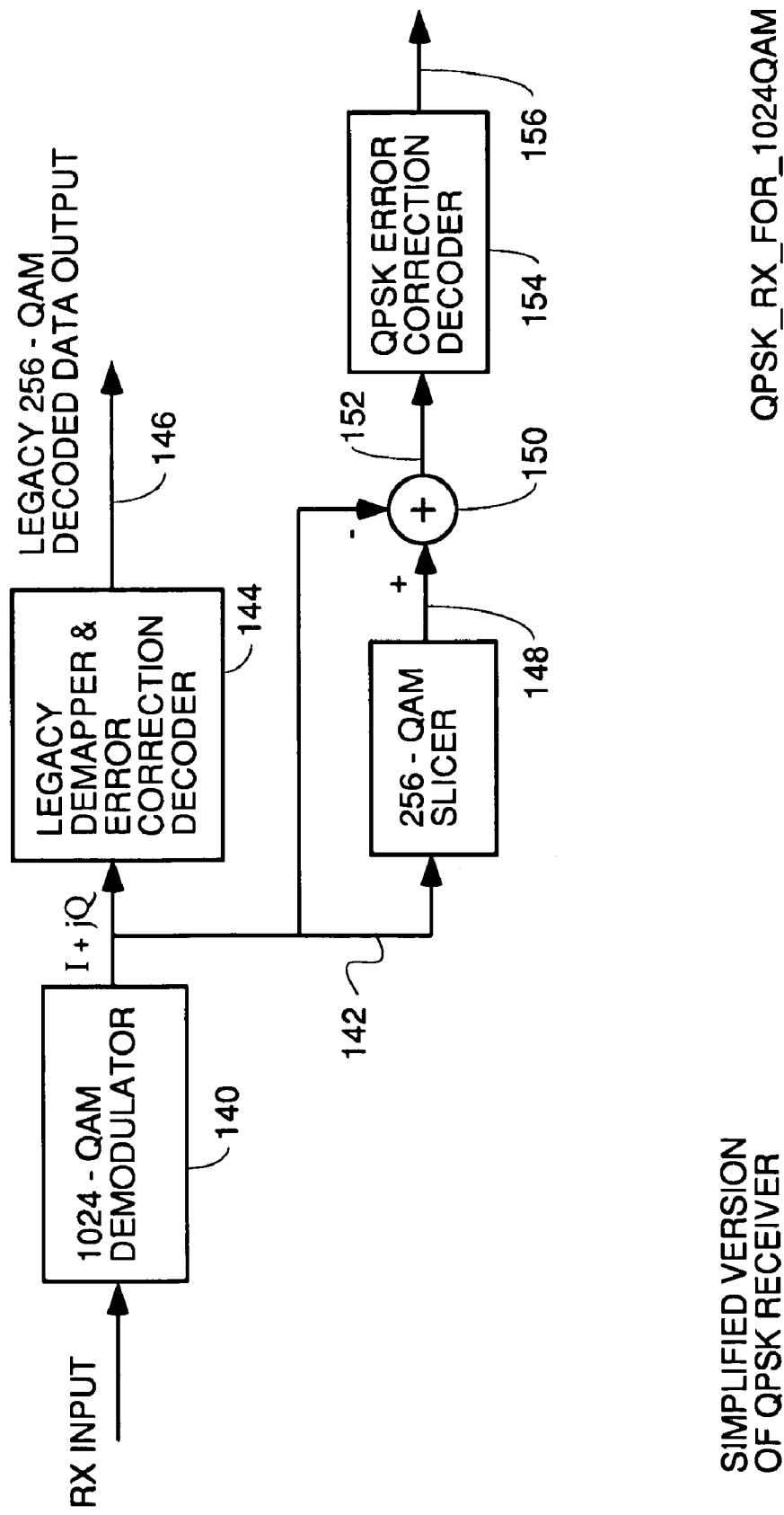
FIG. 8 is a block diagram of a simplified form of the 1024 QAM receiver using one demodulator and two separate error correction decoders.

A simplified version of the 1024 QAM receiver for new cable modems is shown in block diagram form in FIG. 8. A 1024 QAM demodulator 140 receives the downstream radio signal and demodulates it and digitizes the signal and has the same structure and function as demodulator 80 in FIG. 5. The demodulator outputs digital samples representing a complex number on line 142. These complex samples are processed and the data is recovered therefrom in legacy demapper and error correction decoder 144. This circuit is the conventional circuitry found in DOCSIS compatible cable modems to process digital samples of DOCSIS 1.0 and 1.1 signals received from a DOCSIS headend to recover the data encoded in the 256 QAM symbols. That data is output on line 146.

The digital samples on line 142 representing the received 1024 QAM symbols are input to a 256 QAM slicer which generates an error signal on line 148 since the samples on the input line represent 1024 QAM symbols which are the vector sum of a 256 QAM symbol and another constellation point such as a QPSK constellation point, etc. This error signal for each 1024 QAM symbol is subtracted in subtractor 150 from the 1024 QAM symbol on line 142. The result is the 1024 QAM symbol vector with the 256 QAM symbol vector subtracted. This result is represented by vector 34 in FIG. 3, and is output on line 152 to a QPSK error correction decoder 154. In other embodiments, where some new data constellation other than QPSK such as 16 QAM is used, a suitable 16 QAM or other compatible error correction decoder is substituted for circuit 154. There, the new data is recovered and output on line 156.

Turbo codes are explained in several prior art articles published on the internet one of which may be found at http://www331.jpl.nasa.gov/public/TurboForce.GIF which is hereby incorporated by reference. Another example of a more powerful error detection and correction code which may be used to recover the noise corrupted new data are Low-density Parity-check codes (LDPC-codes).

What is an LDPC Code?

An LDPC code is a linear error-correcting code that has an parity check matrix H with a small number of nonzero elements in each row and column. Although LDPC codes can be defined over any finite field, the majority of research is focused on LDPC codes over GF(2), in which "1" is the only nonzero element. The code is the set of vectors x such that Hx'=0.

How can LDPC Codes be Encoded?

Since LDPC codes are linear codes, they can be encoded in the following way. Given a particular parity-check matrix, rearrange by Gauss-elimination so that H=[I_r|h], that is, so that H begins with an r by r identity matrix. (If H is singular, first remove redundant rows until it is non-singular.) A message m, of length k=n−r can be encoded as x=m[h'|I_(n−r)]'. Many specific constructions can be encoded in time approximately or exactly linear in the code size. For example, Repeat-Accumulate (RA) or serial-repeat-accumulate codes have an explicit linear-time encoding method.

How are LDPC Codes Usually Decoded?

LDPC codes are often decoded using some type of iterative message-passing decoding algorithm such as Belief Propagation (BP). Many other message-passing algorithms can be viewed as approximations to BP.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A headend transmitter for transmitting 1024 QAM constellation points, comprising:

a 256 QAM modulator including a 256 QAM mapper, that receives first data and processes it into 256 QAM symbols mapping to vectors in a two dimensional plane;

a second modulator configured to implement a modulation scheme of lower complexity than the 256 QAM modulation implemented by the 256 QAM modulator, the second modulator having an input to receive second data and being configured to generate an output comprising second symbols mapped to a two-dimensional plane, each second symbol being definable as a vector;

a variable gain amplifier coupled to receive the output of the second modulator and configured to provide a variable gain to said output; and a summer configured to perform a vector sum of the output of the variable gain amplifier with a vector representing one of said 256 QAM symbols, wherein headend transmitter transmits an output of the summer on a logical channel to a receiving device, wherein the logical channel is used to receive digital data from the headend transmitter by receiving devices that are 1024 QAM-enabled and by receiving devices that are at most 256-QAM enabled, wherein 1024 QAM-enabled receiving devices and at most 256-QAM enabled receiving devices employ a same symbol rate, wherein, if the receiving device is at most 256-QAM enabled, the receiving device views the output of the variable gain amplifier as noise corruption of the vector representing said one of said 256 QAM symbols, and wherein, if the receiving device is 1024 QAM enabled, the receiving device views the output of the summer as a 1024 QAM symbol.

2. The headend transmitter of claim 1 wherein said 256 QAM modulator is structured to receive an MPEG 2 transport stream containing compressed data encoding video, audio and other data and to randomize the data and to generate Reed Solomon blocks from said randomized data which have been encoded with forward error correction ECC bits, interleave the Reed Solomon blocks, and differentially encode the data before passing it to a 256 QAM mapper where said data is mapped into 256 QAM constellation points.

3. The headend transmitter of claim 1 wherein said 256 QAM modulator generates interleaved block coding blocks from said first data, and wherein said 256 QAM mapper is coupled to receive said interleaved block coding blocks and is structured to process the data in said blocks into Trellis Encoded 256 QAM constellation points.

4. The headend transmitter of claim 1 wherein said 256 QAM mapper encodes data to be transmitted using Trellis Code Modulation.

5. The headend transmitter of claim 1 wherein said second modulator includes a Turbo Code encoder to encode downstream data into Turbo Code codewords.

6. The headend transmitter of claim 1 wherein said 256 QAM modulator comprises:

a physical layer interface that receives first data and having an output;

a sync inversion and randomization circuit that inverts the sync 1 bit according to MPEG-2 framing structure and that randomizes the data stream to break up long strings of ones and zeros for spectrum shaping purposes;

an ECC encoder that encodes data received from said sync inversion and randomization circuit into codewords using a block code and applies an error correction polynomial to each codeword to generate ECC or parity bits which are appended to said codeword;

a convolutional interleaver that performs a depth I=12 or other value convolutional interleaving on said error protected packets to generate an output stream of bytes;

a byte-to-m-tuple conversion that converts said stream of bytes to symbols;

a differential encoder that differentially encodes two most significant bits of each symbol;

a 256 QAM mapper that converts the differentially encoded symbols into 256 QAM symbols; and a clock and synchronization timebase that generates clock and synchronization signals.

7. The headend transmitter of claim 2 wherein said 256 QAM modulator includes a Reed Solomon Encoder which generates said Reed Solomon blocks.

8. The headend transmitter of claim 1 wherein said 256 QAM modulator receives said first data from an MPEG framing circuit using a physical layer interface circuit which adapts the 256 QAM modulator to the format of the signal source of raw payload data, said MPEG framing circuit functioning to compress data of video and/or audio programs and/or broadband internet access and/or other digital services to be transmitted into an MPEG transport stream of MPEG packets.

9. The headend transmitter of claim 1 wherein said 256 QAM modulator includes a physical layer interface that receives MPEG packets which have been encapsulated into local area network packets.

10. The headend transmitter of claim 6 wherein said 256 QAM mapper is a Trellis Code Modulator which functions to encode each incoming symbol with redundant error correction bits before mapping each result to a 256 QAM symbol to be transmitted.

11. The headend transmitter of claim 1 further comprising:
a shaping filter configured to receive and filter an output of said summer; and
a frequency shifter configured to receive an output signal of said shaping filter and to shift the frequency of said output signal to be transmitted downstream into an appropriate frequency band.

12. The headend transmitter of claim 1 wherein said 256 QAM modulator comprises:
a physical layer interface;
a randomizer that randomizes data received from said physical layer interface;
a Reed Solomon encoder that generates RS codewords;
an interleaver that interleaves said RS codewords; and
a Trellis Code Modulator that encodes data of said codewords with additional redundant bits and mapping the encoded data into 256 QAM symbols.

13. The headend transmitter of claim 3 wherein said second modulator comprises:
a physical layer interface that receives said second data in a data format that the physical layer interface is supplied and converts the second data to a format for forward error correction encoding;
a randomizer that randomizes said data output by said physical layer interface;
a block coder that encodes data output by said randomizer into codewords of any block code using a codeword size, T value, polynomial and coding type as legacy data processed by said 256 QAM modulator;
an interleaver that interleaves data output by said block coder; and
a Trellis encoder that encodes data output by said interleaver with redundant bits and maps the resulting encoded data into symbols of the constellation of a modulation type being used for said new data.

14. The headend transmitter of claim 13 wherein said physical layer interface outputs MPEG packets of an MPEG transport stream, and wherein said block coder is a Turbo Code encoder.

15. The headend transmitter of claim 1 wherein said second modulator comprises a forward error correction circuitry to encode said second data to protect it from noise and channel impairments and a mapper to map said forward error correction encoded data into a constellation.

16. The headend transmitter of claim 15 wherein said 256 QAM modulator comprises a forward error correction circuitry structured to encode said first data to be mapped into 256 QAM symbols with ECC bits and Trellis Code Modulation redundant bits to protect said first data from channel noise and channel impairments and noise caused by the addition of a second data symbol to each 256 QAM symbol.

17. The headend transmitter of claim 16 wherein said second modulator is structured to encode said second data with ECC bits and redundant Trellis Code Modulation bits to protect said second data from channel noise and noise caused by addition of a second data symbol to each 256 QAM symbol.

18. The headend transmitter of claim 16 wherein said 256 QAM modulator and said second modulator use at least one Turbo Code encoder to generate an error correction code.

19. The headend transmitter of claim 16 wherein said 256 QAM modulator is a conventional headend downstream transmitter that complies with DOCSIS 1.0 and 1.1.

20. The headend transmitter of claim 19 wherein said 256 QAM modulator pseudorandomly scrambles said first data for privacy purposes.

21. The headend transmitter of claim 11 wherein said shaping filter is a square root raised cosine filter and is also an adaptive filter structured to adapt its coefficients so as to perform downstream equalization filtering on the symbols to be transmitted.

* * * * *